H. R. HANSEN.
COFFEE URN.
APPLICATION FILED MAY 29, 1908.
987,096.
Patented Mar. 14, 1911.
2 SHEETS—SHEET 1.
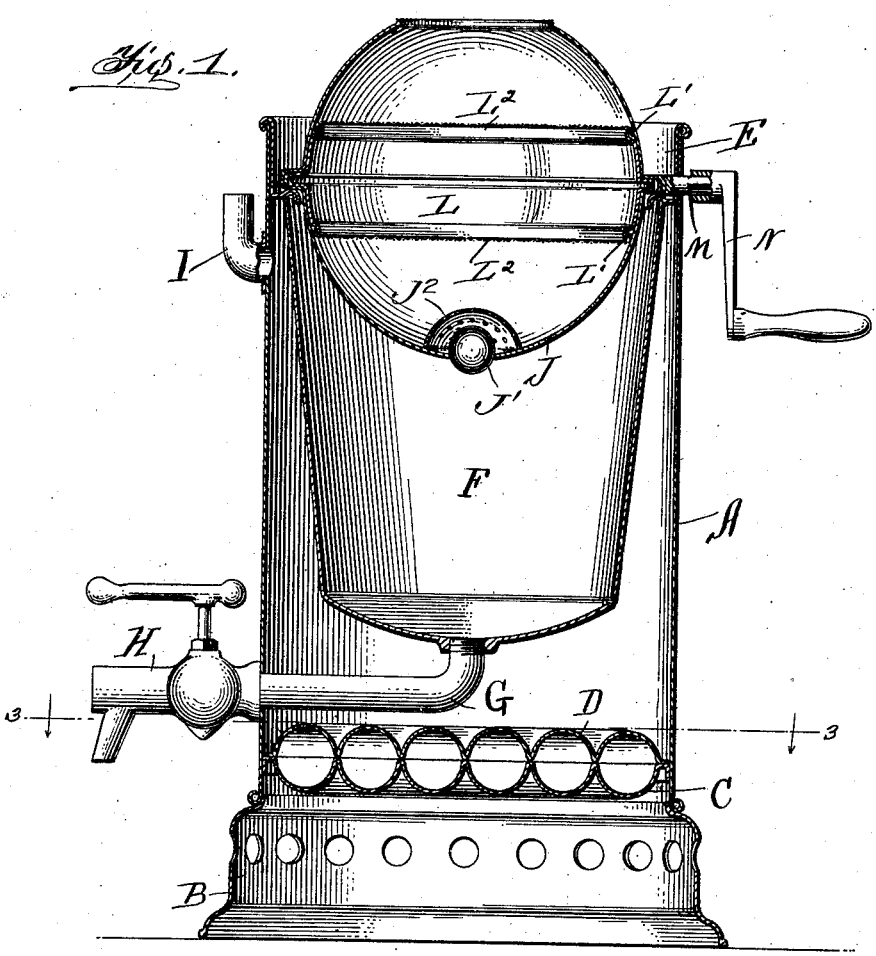
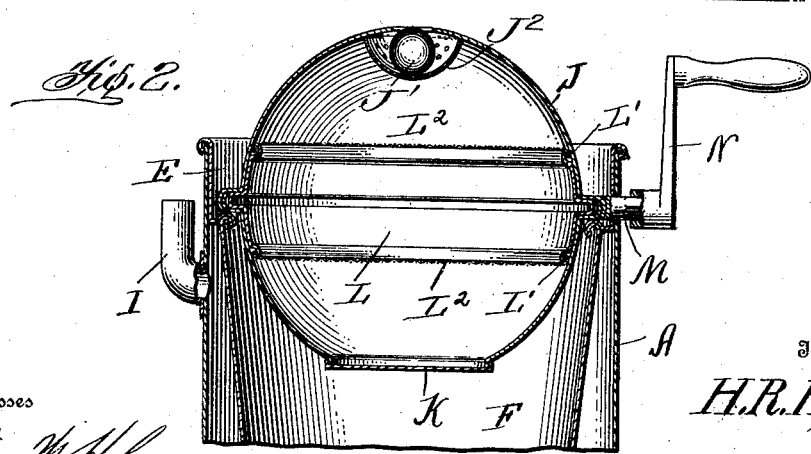
Witnesses
Inventor
H. R. Hansen,
By O'Meara & Brock
Attorneys H. R. HANSEN.
COFFEE URN.
APPLICATION FILED MAY 29, 1908.
987,096.
Patented Mar. 14, 1911.
2 SHEETS—SHEET 2.
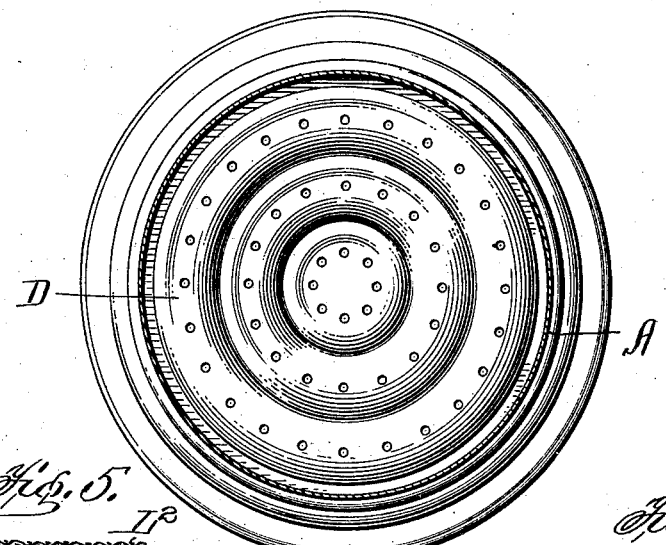
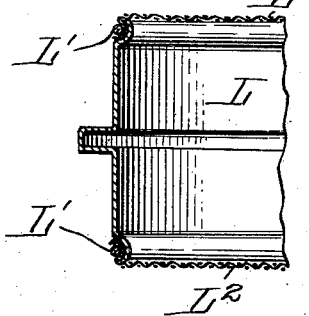
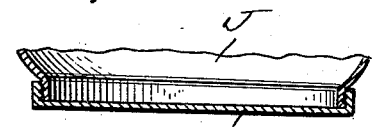
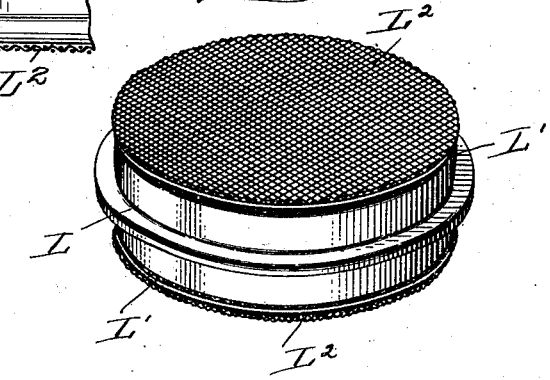
Witnesses
Inventor
H. R. Hansen,
By O'Meara & Brock
Attorneys

UNITED STATES PATENT OFFICE.

HERMAN R. HANSEN, OF BROOKLYN, NEW YORK.

COFFEE-URN.

987,096.  Specification of Letters Patent.  Patented Mar. 14, 1911.

Application filed May 29, 1908. Serial No. 435,723.

*To all whom it may concern:*

Be it known that I, HERMAN R. HANSEN, a citizen of the United States, residing at Brooklyn, in the county of Kings and State of New York, have invented a new and useful Improvement in Coffee-Urns, of which the following is a specification.

This invention relates to coffee urns, the object being to provide an urn with a revoluble percolator whereby the liquid can be passed through the coffee holder, one or more times so as to give it the required strength.

Another object of my invention is to provide a novel coffee holder which is provided with strainers so connected that they can be readily removed to enable the coffee to be placed therein.

Another object of my invention is to provide a percolator which is formed of a globular vessel having arranged centrally therein a coffee holder, the vessel being provided with an opening which is closed by a cap.

With these and other objects in view, the invention consists in the novel features of construction, combination and arrangement of parts, hereinafter fully described and pointed out in the claims.

In the drawings forming a part of this specification:—Figure 1 is a vertical section through my improved urn. Fig. 2 is a detail vertical section showing the globular vessel in a reverse position to that of Fig. 1. Fig. 3 is a section taken on the line 3—3 of Fig. 1. Fig. 4 is a perspective view of the coffee holder detached. Fig. 5 is an enlarged detail sectional view of a portion of a coffee holder. Fig. 6 is an enlarged sectional view of a cap, illustrating the method of securing the same in place.

Referring to the drawings A indicates a casing forming the body of my improved urn which is mounted on a base B in which are adapted to be arranged the heaters, not shown. A bottom C is secured in the body provided with concentric corrugations, over which is arranged a false-bottom D provided with reverse concentric corrugations forming annular chambers the false-bottom being provided with a series of perforations.

A ring E is arranged within the body provided with a hooked edge adapted to fit over the upper edge of the body for supporting the same, the lower edge of the ring having an inwardly projecting annular flange, to which is secured the upper edge of a vessel F which is provided with a concaved bottom having a centrally threaded boss in which is secured the angled threaded end of a pipe G which extends out through the casing A, provided with an ordinary faucet H for dispensing the coffee. A vent-pipe I is secured in one side of the casing A for allowing the steam to escape and it will be seen that when water is placed within the body A and the heater started the vessel F will be thoroughly heated.

Revolubly mounted on the inwardly projecting flange of the ring E is a globular vessel J which is preferably formed of two sections connected together centrally, one of the sections of the vessel being provided with a flanged opening adapted to be closed by the cap K which is secured thereon by any suitable means, but the flange is preferably formed threaded and the cap threaded, so that it can be screwed in position, whereby all danger of it being forced off by the weight of the liquid is prevented. The other section of the globular vessel J is provided with a central opening having beveled edges forming a seat for a ball valve J' over which is secured a spherical strainer J² for allowing air to enter the vessel.

Arranged centrally within the vessel J is a coffee-holder L which comprises a ring having an annular groove adjacent each edge, in which is adapted to fit a binding ring L' for securing a strainer L² over the same, so that the pulverized coffee will be held between oppositely disposed strainers, whereby the water can percolate through the same. A shaft M extends through the casing A and ring E and is connected to the section of vessel J carrying the cap K and is provided with a crank-handle N at its outer end for operating the same, whereby the vessel can be readily rotated.

The operation is as follows:—The coffee holder is filled with pulverized coffee and the vessel turned into the position shown in Fig. 1 and boiling water is poured into the same and the cap is then screwed into position so as to close the opening, and after the water has percolated through the coffee in the holder into the other section of the vessel, the crank-arm is turned so as to reverse the position of the vessel and allow the liquid to percolate back through the coffee holder, this operation being repeated until the coffee has become strong enough. The cap is then removed and by turning the vessel so as to bring the opening at the bottom, the liquid will pass into the vessel F where it can be readily drawn off through the faucet H.

Having thus fully described my invention, what I claim as new and desire to secure by Letters Patent is:—

1. In a device of the kind described, the combination with a vessel, of a second vessel revolubly mounted therein, said revoluble vessel being open at one side and provided with an opening upon the opposite side, and a valve for closing said opening.

2. In a device of the kind described, the combination with a vessel, of a second rotatable vessel supported therein said rotatable vessel being open at one side and provided with a valved opening at the opposite side, a valve coacting with said opening and a percolator arranged centrally within the rotatable vessel, substantially as described.

3. In a device of the kind described, the combination with a percolator, of a sectional vessel adapted to retain said percolator centrally therein, when said sections are united, one of said sections being open at one side, the other section having an opening, a ball valve adapted to fit within, and a guard for holding said ball valve in place, said vessel and percolator being arranged within a vessel and rotatable therein.

4. The combination with a vessel having an annular shoulder, of a sectional globular vessel supported upon said shoulder and rotatable thereon, and a percolator held centrally within the sectional vessel and between the sections thereof, one of said sections having an opening, the other section having an opening and a gravity operated valve for closing said opening, and means connected to said sectional vessel for rotating the same.

5. In an urn, the combination with an outer casing, of a vessel supported within said casing, a pipe connected to the bottom of said vessel extending out through said casing and provided with a faucet, a globular vessel revolubly mounted above said vessel and provided with a flanged opening, a cap for closing said opening, a coffee holder arranged within said vessel comprising a supporting ring having strainers secured over its edges by rings, and a shaft carrying a crank-arm for operating said vessel.

HERMAN R. HANSEN.

Witnesses:
W. B. LAWSON,
EINAR H. HANSEN.

Copies of this patent may be obtained for five cents each, by addressing the "Commissioner of Patents, Washington, D. C."